Jan. 5, 1932.  J. S. HOBSON  1,840,098

LENS FOR LIGHT SIGNALS

Filed Sept. 11, 1928

INVENTOR:
J. S. Hobson,
by A. R. Vennell,
His Attorney.

Patented Jan. 5, 1932

1,840,098

UNITED STATES PATENT OFFICE

JOHN S. HOBSON, OF CHICAGO, ILLINOIS, ASSIGNOR TO THE UNION SWITCH & SIGNAL COMPANY, OF SWISSVALE, PENNSYLVANIA, A CORPORATION OF PENNSYLVANIA

LENS FOR LIGHT SIGNALS

Application filed September 11, 1928. Serial No. 305,166.

My invention relates to lenses for railway light signals, and it has for an object the provision of a lens which will give a distinctive color indication visible at maximum distance from the signal.

I will describe two forms of lenses embodying my invention, and will then point out the novel features thereof in the claim.

Figure 1:
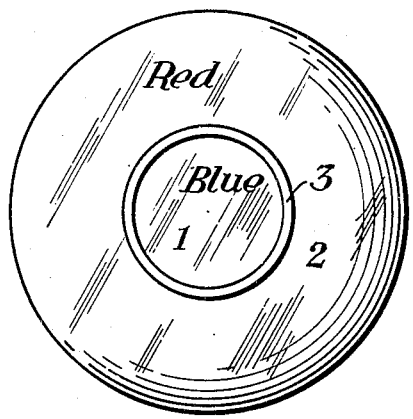
Figure 2:
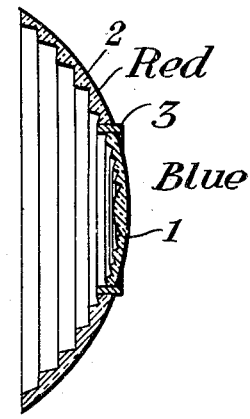
Figure 3:
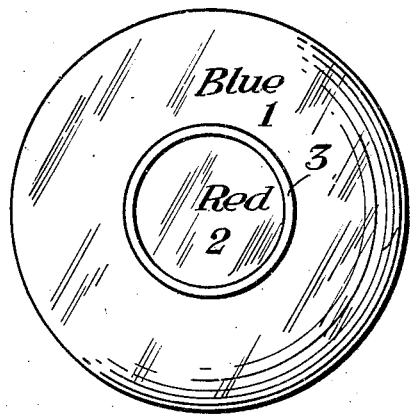
Figure 4:
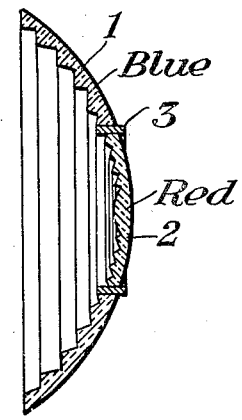

In the accompanying drawings, Fig. 1 is a view showing a front elevation of one form of lens embodying my invention, and Fig. 2 is a sectional view of the lens shown in Fig. 1. Figs. 3 and 4 are views similar to Figs. 1 and 2 respectively, but showing a modified form of lens also embodying my invention.

Referring first to Figs. 1 and 2, the lens which is shown in these views comprises a central circular member 1 made of glass of one color, and an annular member 2 surrounding the central member 1 but made of glass having a different color. As here shown, the central member 1 is blue glass and the annular member 2 is red glass. The central member 1 may be retained in place in the annular member 2 by any suitable means, such, for example, as a metal ring 3.

The customary color for the stop indication of a railway light signal is red, but when the signal is located close to the ground this color has proven objectionable because of the possibility that the signal will be mistaken for one of the tail lights of a train, such tail lights customarily being red. For this reason, a purple lens has some times been used for the stop indication of signals which are close to the ground, such as dwarf signals. A purple signal, however, has the disadvantage that its range of visibility is considerably shorter than that of a red signal. One object of my invention is to provide a signal having the combined advantages of the distinctive purple indication with the relatively long range of visibility of the red indication. When a signal provided with the lens shown in Figs. 1 and 2, is viewed from a considerable distance, the two colors blend to give a distinctive indication which is neither red nor blue, but is of a pinkish hue due to the mingling of the red and blue, and which is visible at a greater distance than if the lens were purple. At long range, then, the indication is clearly distinguishable from the tail light of a train. When viewed from a relatively short distance, however, the red and blue are individually visible. It follows, therefore, that from all points in the range of visibility the signal has a distinctive indication differing from that of any other signal light, and thus can easily be distinguished from the red tail light of a train.

The lens shown in Figs. 3 and 4 is the same as that shown in Figs. 1 and 2, except that the central member is made of red glass and the annular outside member is made of blue glass. The effect of this combination is substantially the same as the effect of the combination shown in Figs. 1 and 2.

Although I have herein shown and described only two forms of lenses embodying my invention, it is understood that various changes and modifications may be made therein within the scope of the appended claim without departing from the spirit and scope of my invention.

Having thus described my invention, what I claim is:

A lens for a railway light signal, comprising a central member and an outer annular member both projecting the light beams in the same direction, one of which members is red and the other blue, whereby at long range the signal gives an indication of a pinkish hue due to mingling of the red and blue rays, which indication is visible at a greater distance than if the lens were purple, whereas at close range the red and blue are individually visible, with the result that from all points of the range of visibility the signal has distinctive color indications differing from the indication given by any other signal light and thus easily distinguishable from the red tail light of a train.

In testimony whereof I affix my signature.

JOHN S. HOBSON.